Sept. 26, 1961 — T. S. LO DUCA — 3,001,434
KEYBOARD FOR CHORD ORGAN
Filed March 23, 1959
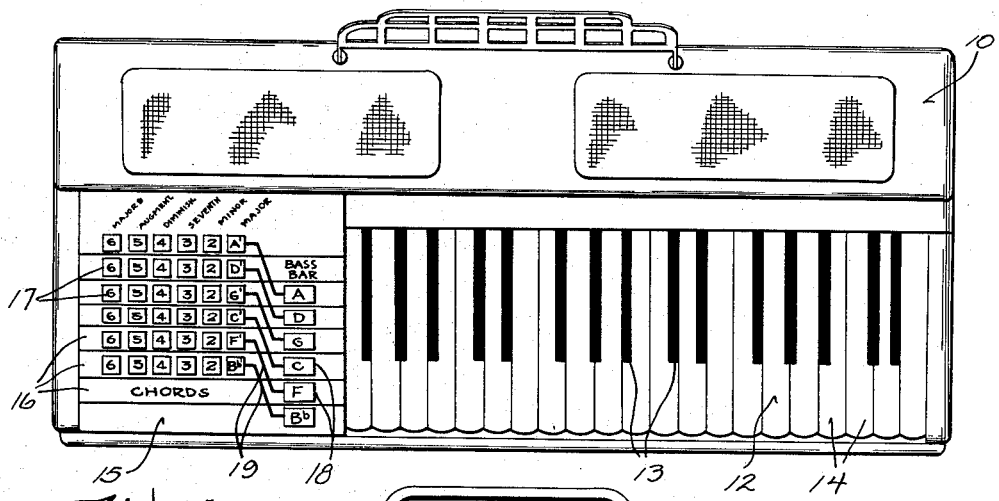
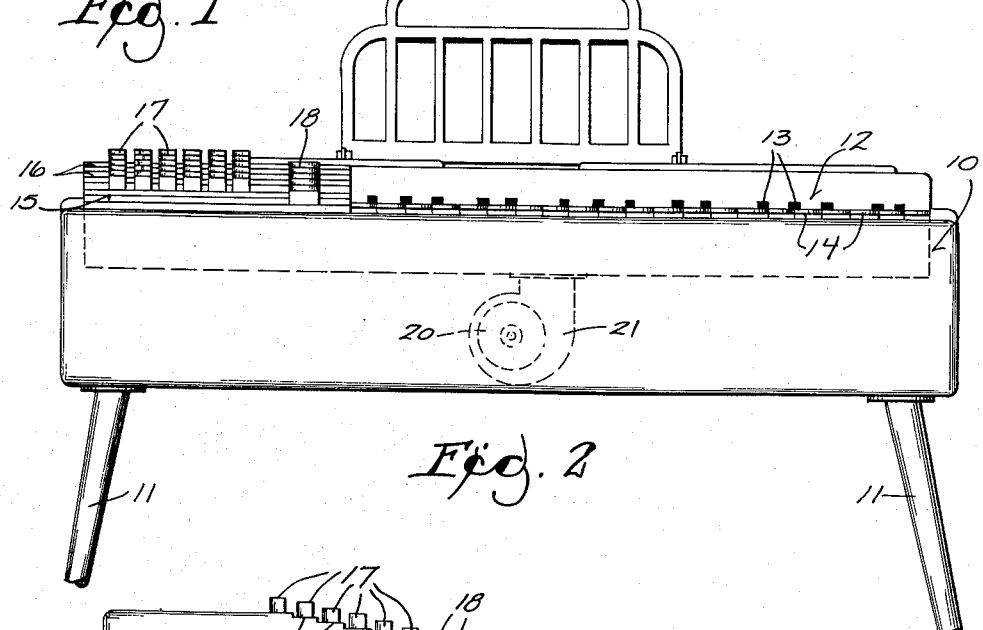
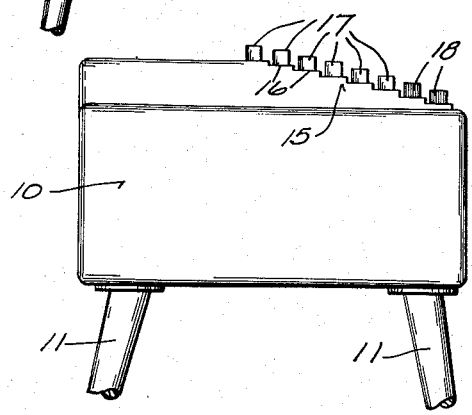
INVENTOR.
THOMAS S. LoDUCA
BY
Gerald P. Welch
ATTORNEY

United States Patent Office 3,001,434
Patented Sept. 26, 1961

3,001,434
KEYBOARD FOR CHORD ORGAN
Thomas S. Lo Duca, 2245 N. 24th Place, Milwaukee, Wis.
Filed Mar. 23, 1959, Ser. No. 801,354
1 Claim. (Cl. 84—443)

This invention relates to improvements in keyboards for chord organs, and more particularly to a novel keyboard including groups of chord keys and related bass bars.

An object of the invention is to provide a device of the type including chord keys with the related bass bar so disposed as to be convenient to the thumb of the operator when a finger or fingers are operating the appropriate chord keys.

Another object of the invention is to provide a keyboard having a step formation which will facilitate reading of the names of the chords, reference numerals and letters.

Other and further objects of the invention will appear as the description proceeds, reference being had to the accompanying drawing, in which:

FIG. 1 is a plan view of a chord keyboard and bass bar embodying the invention.

FIG. 2 is a front view of an organ so equipped.

FIG. 3 is an end view in elevation of the chord keyboard which is constructed on a step arrangement.

Referring more particularly to the drawing, the numeral 10 refers to an instrument housing or case having the supporting legs 11, and a conventional keyboard 12 of black and white notes, 13 and 14.

A chord keyboard 15 is mounted on a series of steps 16, and includes six keys or buttons 17 for each one of six different musical keys, i.e., B flat, F, C, G, D and A.

Included in the chord keyboard is a bass bar, comprising six separate bars, one for each of the above keys B flat, F, C, G, D and A. These bars 18 are adapted to be depressed by the thumb of the left hand of the operator while the related chord keys 17 are manipulated by the fingers.

Lines 19 are an aid to the eye in selecting the proper chord keys relatively to the bass bar. It will be understood that the chord keyboard 15 and bass bar 18 could be mounted flat or on an incline as well as on the step surface as shown.

The chord buttons 17 permit the selection of a major, minor, seventh, diminished, augmented, or major 9th chord in any one or more of the six musical keys. Each chord is preset, and when a button 17 is depressed a combination of notes or a pre-set chord is sounded.

It will be understood that the device is capable of many modifications in structure and design, without departing from the spirit of the invention, within the scope of the appended claim.

Having thus described the invention, it will be understood that the chord keyboard as described may be used with any electronic organ, or any reed organ having a motor 20 with blower 21 as shown, which provides a current of air which is made available to the reeds by the opening of valves operated by the keys 17, bars 18, and the keys 13 and 14.

What is claimed and desired to be secured by Letters Patent of the United States, is:

A chord keyboard comprising a panel, a plurality of chord keys arranged in rows rectangularly on said panel, and a plurality of bass bars related to the chord rows spaced vertically relatively to each other disposed to the right of said chord keys and arranged two rows closer to the player on said panel whereby the thumb may engage a bass bar and the fingers the related chord keys of the same musical key.

References Cited in the file of this patent
UNITED STATES PATENTS

| 360,255 | Janko | Mar. 29, 1887 |
| 1,652,464 | Tyberg | Dec. 13, 1927 |
| 2,084,266 | George et al. | June 15, 1937 |
| 2,243,834 | Bonilla | June 3, 1941 |
| 2,645,968 | Hanert | July 21, 1953 |
| 2,845,831 | Hammond | Aug. 5, 1958 |

FOREIGN PATENTS

| 214,613 | Germany | Oct. 16, 1909 |
| 667,567 | Germany | Nov. 14, 1938 |